United States Patent Office 3,288,840
Patented Nov. 29, 1966

3,288,840
2-PROPYNYL SALICYLATE
Chester E. Pawloski, Bay City, Mich., assignor to The Dow Chemical Company, Midland, Mich., a corporation of Delaware
No Drawing. Filed Dec. 26, 1963, Ser. No. 333,705
1 Claim. (Cl. 260—474)

The present invention is directed to a compound corresponding to the formula

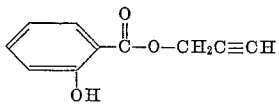

This compound is a low melting solid which is somewhat soluble in many organic solvents and of low solubility in water. The compound has been found to be useful as a pesticide for the control of various insect, mite, worm, bacterial and fungal organisms such as roundworms, beetles, roaches, mites and blight.

The new compound can be prepared by reacting an alkali metal salt of salicylic acid with a propargyl halide such as propargyl bromide or propargyl chloride. The reaction is preferably carried out in a liquid reaction medium such as isopropanol, acetone or methyl ethyl ketone. The reaction takes place smoothly at temperatures at which the halide of reaction is formed and preferably from about 10 to 100° C. The halide of reaction appears in the mixture as the salt of the alkali metal cation from the salicylic acid alkali metal salt. The amounts of the reactants which are to be employed are not critical, some of the desired product being obtained when employing the reactants in any amount. However, the reaction consumes the reactants in equimolar proportions and the use of amounts which represent such proportions is preferred. Upon completion of the reaction the desired product can be separated and purified by conventional procedures.

In carrying out the reaction the propargyl halide and the salicyclic acid alkali metal salt such as the potassium or the sodium salt can be combined in any convenient manner. However, it is preferable to disperse the reactants in an organic liquid reaction medium. The reaction mixture is maintained for a period of time at the reaction temperature to insure completion of the reaction. The warm reaction mixture is then filtered to remove the halide of reaction and the filtrate evaporated to leave the product as a residue which may be employed in pesticidal applications. This product residue may be further purified by such conventional procedures as washing with organic solvent and water or recrystalization from a common organic solvent.

In a representative operation salicyclic acid sodium salt (40 grams) and propargyl bromide (35 grams) were dispersed in 100 milliliters of acetone and the resulting mixture heated at the boiling point and under reflux for twenty-four hours. The reaction mixture was then filtered while hot to remove the potassium bromide and the filtrate allowed to evaporate over night leaving the 2-propynyl salicylate product as a solid residue. This residue was collected and washed with water. The washed product had a melting point of 47° to 49° C.

The novel product of the present invention is useful as a pesticide for the control of the growth and killing of a number of insect, mite, worm, bacterial, fungal and plant organisms. For such uses, the product is dispersed on a finely divided solid such as chalk, talc or bentonite and employed as a dust. Such mixtures may also be dispersed in water with or without the aid of a surface active agent, and the resulting aqueous suspension employed as a spray. In other procedures, the product is employed as an active constituent in solvent solutions such as oil-in-water or water-in-oil emulsions, or aqueous dispersions which can be used as a spray, drench or wash. In representative operations, compositions containing 300 parts per million by weight of 2-propynyl salicylate give 100 percent kills of round worms.

I claim:
2-propynyl salicylate.

No references cited.

LORRAINE A. WEINBERGER, *Primary Examiner.*
S. B. WILLIAMS, *Assistant Examiner.*